United States Patent
El-Refaie et al.

(10) Patent No.: US 9,685,900 B2
(45) Date of Patent: Jun. 20, 2017

(54) LOW-INDUCTANCE, HIGH-EFFICIENCY INDUCTION MACHINE AND METHOD OF MAKING SAME

(75) Inventors: Ayman Mohamed Fawzi El-Refaie, Niskayuna, NY (US); Robert Dean King, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1599 days.

(21) Appl. No.: 12/949,882

(22) Filed: Nov. 19, 2010

(65) Prior Publication Data

US 2012/0126741 A1  May 24, 2012

(51) Int. Cl.
  H02P 1/24 (2006.01)
  H02P 1/42 (2006.01)
  H02P 3/18 (2006.01)
  H02P 27/08 (2006.01)

(52) U.S. Cl.
  CPC ..................... *H02P 27/08* (2013.01)

(58) Field of Classification Search
  CPC ...................................... H02P 27/08
  USPC ............................. 318/727, 811, 782, 400.23
  See application file for complete search history.

(56) References Cited

U.S. PATENT DOCUMENTS

| | | | |
|---|---|---|---|
| 5,041,896 A | 8/1991 | Temple et al. | |
| 5,385,855 A | 1/1995 | Brown et al. | |
| 5,510,281 A | 4/1996 | Ghezzo et al. | |
| 5,510,632 A | 4/1996 | Brown et al. | |
| 5,514,604 A | 5/1996 | Brown | |
| 5,543,703 A * | 8/1996 | Kusase et al. | 322/16 |
| 5,672,889 A | 9/1997 | Brown | |
| 5,719,484 A | 2/1998 | Taniguchi et al. | |
| 5,726,463 A | 3/1998 | Brown et al. | |
| 5,731,689 A * | 3/1998 | Sato | 322/25 |
| 5,814,859 A | 9/1998 | Ghezzo et al. | |
| 5,963,791 A | 10/1999 | Brown et al. | |
| 6,198,183 B1 | 3/2001 | Baeumel et al. | |
| 6,239,582 B1 | 5/2001 | Buzan et al. | |
| 6,498,451 B1 * | 12/2002 | Boules et al. | 318/661 |
| 6,690,592 B2 | 2/2004 | Link | |

(Continued)

FOREIGN PATENT DOCUMENTS

| CN | 101197546 A | 6/2008 |
|---|---|---|
| CN | 101331673 A | 12/2008 |

(Continued)

OTHER PUBLICATIONS

EP Search Report and Opinion dated Apr. 25, 2012 from corresponding EP Application No. 11189255.0.

(Continued)

*Primary Examiner* — Erick Glass
(74) *Attorney, Agent, or Firm* — Meagher Emanuel Laks Goldberg & Liao, LLP

(57) ABSTRACT

An electric drive system includes an induction machine and a power converter electrically coupled to the induction machine to drive the induction machine. The power converter comprising a plurality of silicon carbide (SiC) switching devices. The electric drive system further includes a controller that is electrically coupled to the power converter and that is programmed to transmit switching signals to the plurality of SiC switching devices at a given switching frequency such that a peak-to-peak current ripple is less than approximately five percent.

24 Claims, 2 Drawing Sheets

(56) References Cited

U.S. PATENT DOCUMENTS

| | | | |
|---|---|---|---|
| 6,843,335 | B2 | 1/2005 | Shirakawa et al. |
| 6,997,687 | B2 | 2/2006 | Iritani |
| 7,009,318 | B2 | 3/2006 | Iritani et al. |
| 7,038,260 | B1 | 5/2006 | Yu |
| 7,210,304 | B2 | 5/2007 | Nagashima |
| 7,218,021 | B2* | 5/2007 | Nilson ............... 310/68 B |
| 7,351,637 | B2 | 4/2008 | Tucker |
| 7,414,339 | B2 | 8/2008 | Kitamura et al. |
| 7,517,807 | B1 | 4/2009 | Tucker et al. |
| 7,521,732 | B2 | 4/2009 | Matocha et al. |
| 7,554,220 | B2 | 6/2009 | Sugawara |
| 7,652,858 | B2 | 1/2010 | Tang et al. |
| 7,679,941 | B2 | 3/2010 | Raju et al. |
| 7,690,456 | B2 | 4/2010 | Deng et al. |
| 7,787,270 | B2 | 8/2010 | NadimpalliRaju et al. |
| 8,074,753 | B2 | 12/2011 | Tahara et al. |
| 8,083,557 | B2 | 12/2011 | Sullivan |
| 8,102,687 | B2* | 1/2012 | Takasu et al. ............. 363/132 |
| 8,148,859 | B2 | 4/2012 | Yoshida et al. |
| 8,193,756 | B2 | 6/2012 | Jadric et al. |
| 2004/0119292 | A1 | 6/2004 | Datta et al. |
| 2005/0127396 | A1 | 6/2005 | Mitra et al. |
| 2006/0047358 | A1 | 3/2006 | Liang et al. |
| 2006/0086981 | A1 | 4/2006 | Yamaguchi et al. |
| 2006/0152085 | A1* | 7/2006 | Flett et al. ............. 307/75 |
| 2006/0267021 | A1 | 11/2006 | Rowland et al. |
| 2007/0015373 | A1 | 1/2007 | Cowen et al. |
| 2007/0120208 | A1 | 5/2007 | Mitra |
| 2007/0126007 | A1 | 6/2007 | Matocha |
| 2007/0151272 | A1 | 7/2007 | Cosan et al. |
| 2007/0224784 | A1 | 9/2007 | Soloviev et al. |
| 2007/0238253 | A1 | 10/2007 | Tucker |
| 2008/0014693 | A1 | 1/2008 | Matocha |
| 2008/0018289 | A1 | 1/2008 | Tajima et al. |
| 2008/0038890 | A1 | 2/2008 | Tucker |
| 2008/0050876 | A1 | 2/2008 | Matocha et al. |
| 2008/0108190 | A1 | 5/2008 | Matocha |
| 2008/0132047 | A1 | 6/2008 | Dunne et al. |
| 2008/0142811 | A1 | 6/2008 | Matocha et al. |
| 2008/0143183 | A1 | 6/2008 | Hoshiba |
| 2008/0146004 | A1 | 6/2008 | Matocha et al. |
| 2008/0238520 | A1 | 10/2008 | de Rooij et al. |
| 2009/0084472 | A1 | 4/2009 | Gigliotti, Jr. et al. |
| 2009/0117722 | A1 | 5/2009 | Tucker et al. |
| 2009/0159896 | A1 | 6/2009 | Arthur et al. |
| 2009/0194772 | A1 | 8/2009 | Stum et al. |
| 2009/0242292 | A1 | 10/2009 | Heller et al. |
| 2009/0279337 | A1 | 11/2009 | Hamatani |
| 2009/0289583 | A1 | 11/2009 | Yoshida |
| 2010/0050676 | A1 | 3/2010 | Takamatsu et al. |
| 2010/0090227 | A1 | 4/2010 | Lou et al. |
| 2010/0093116 | A1 | 4/2010 | Fronheiser et al. |
| 2010/0200931 | A1 | 8/2010 | Matocha et al. |

FOREIGN PATENT DOCUMENTS

| | | |
|---|---|---|
| DE | 102005032971 A1 | 1/2007 |
| EP | 0751601 A2 | 1/1997 |
| EP | 1947756 A1 | 7/2008 |
| EP | 2149469 A1 | 2/2010 |
| GB | 2301949 A | 12/1996 |
| GB | 2463483 A | 3/2010 |
| JP | 02106159 A | 4/1990 |
| JP | 06284504 A | 10/1994 |
| JP | 07-337020 A | 12/1995 |
| JP | 11-307352 A | 5/1999 |
| JP | 11-206183 A | 7/1999 |
| JP | 2001-309683 A | 11/2001 |
| JP | 2004289935 A | 10/2004 |
| JP | 2005160284 A | 6/2005 |
| JP | 2005199986 A | 7/2005 |
| JP | 2006-042529 A | 2/2006 |
| JP | 2006-121877 A | 5/2006 |
| JP | 2006-180675 A | 7/2006 |
| JP | 2006217743 A | 8/2006 |
| JP | 2006320134 A | 11/2006 |
| JP | 2007116840 A | 5/2007 |
| JP | 2007166900 A | 6/2007 |
| JP | 2008017682 A | 1/2008 |
| JP | 2008029115 A | 2/2008 |
| JP | 2008-061414 A | 3/2008 |
| JP | 2008189249 A | 8/2008 |
| JP | 2009-050059 A | 3/2009 |
| JP | 2010068641 A | 3/2010 |
| JP | 2010-074869 A | 4/2010 |
| JP | 2010130837 A | 6/2010 |
| JP | 2010239823 A | 10/2010 |
| WO | 2010122404 A1 | 10/2010 |

OTHER PUBLICATIONS

EP Search Report and Opinion dated Aug. 21, 2012 from corresponding EP Application No. 11189253.5.

Matocha, "Challenges in SiC Power MOSFET Design," ISDRS 2007, Dec. 12-14, 2007, College Park, MD, pp. 1-2, http://www.ece.umd.edu/ISDRS.

Matocha et al., "Getting the Most from SiC MOSFETs: Optimizing Conduction and Switching Losses for High Performance Power Electronics Applications," ISDRS 2009, Dec. 9-11, 2009, College Park, MD, pp. 1-2, http://www.ece.umd.edu/ISDRS2009.

Stevanovic et al. "Recent Advances in Silicon Carbide MOSFET Power Devices," Applied Power Elect. Conference 2010, pp. 401-407.

Matocha et al., "1400 Volt, 5 milli-ohms-cm2 SiC MOSFETs for High-Speed Switching," Proceedings of The 22nd International Symposium on Power Semiconductor Devices & ICs, Hiroshima, pp. 365-368.

Matocha et al., "Performance and Reliability of SiC MOSFETs for High-Current Power Modules," ICSCRM 2009, pp. 1-4.

Stum et al., "4kV Silicon Carbide MOSFETs," The 8th European Conference on Silicon Carbide and Related Materials, Oslo, Norway, Aug. 29-Sep. 2, 2010, pp. 1-4.

Gurfinkel et al., "Time-Dependent Dielectric Breakdown of 4H—SiC/SiO2 MOS Capacitors," IEEE Transactions on Device and Materials Reliability, vol. 8, No. 4, Dec. 2008, pp. 635-641.

Stum et al., "300° C Silicon Carbide Integrated Circuits," The 8th European Conference on Silicon Carbide and Related Materials, Oslo, Norway, Aug. 29-Sep. 2, 2010, pp. 1-4.

Tilak et al., "Electron-Scattering Mechanisms in Heavily Doped Silicon Carbide MOSFET Inversion Layers," IEEE Transactions On Electron Devices, vol. 54, No. 11, Nov. 2007, pp. 2823-2829.

Losee et al., "DC and Transient Performance of 4H—SiC Double-Implant MOSFETs," IEEE Transactions on Electron Devices, vol. 55, No. 8, Aug. 2008, pp. 1824-1829.

Matocha et al., "Time-Dependent Dielectric Breakdown of 4H—SiC MOS Capacitors and DMOSFETs," IEEE Transactions On Electron Devices, vol. 55, No. 8, Aug. 2008, pp. 1830-1834.

Matocha, "Challenges in SiC Power MOSFET Design," Solid-State Electronics, vol. 52, 2008, pp. 1631-1635, journal homepage: www.elsevier.com/locate/sse.

Elasser et al., "3kV 4H—SiC Thyristors for Pulsed Power Applications," Abstract, Materials Science Forum, vols. 645-648, 2010, pp. 1053-1056.

Losee et al., "100 Amp, 1000 Volt Class 4H-Silicon Carbide MOSFET Modules," Abstract, Materials Science Forum, vols. 615-617, 2009, pp. 899-903.

Matocha et al., "Understanding the inversion-layer properties of the 4H—SiC/SiO2 interface," The 8th European Conference on Silicon Carbide and Related Materials, Oslo, Norway, Aug. 29-Sep. 2, 2010, pp. 1-8.

EP Search Report and Opinion dated May 3, 2012 from corresponding EP Application No. 11189127.1.

Chinese Search Report issued in connection with corresponding CN Application No. 201110385885.8, dated Dec. 5, 2014.

English Translation of Search Report for corresponding JP 2011-250219, dated Dec. 10, 2015.

(56) References Cited

OTHER PUBLICATIONS

El-Refaie et al., "Comparison of Synchronous PM Machine Types for Wide Constant-Power Speed Range Operation", Conference Record- IAS Annual Meeting (IEEE Industry Applications Society), pp. 1015-1022, 2005.
Horrdin et al., "Technology Shifts in Power Electronics and Electric Motors for Hybrid Electric Vechicles", Master of Science Thesis, Chalmers University of Technology, pp. 1-69, 2007.
Shah, "Designing Small Efficient AC/DC Switching Power Supplies", EDN Network, vol. No. 56, pp. 53-56, Sep. 27, 2007.
Zhang et al., "SiC's Potential Impact on the Design of Wind Generation System", In Proceedings IEEE Ind.Electron. Conf, pp. 2231-2235, 2008.
Unofficial English Translation of Japanese Office Action issued in connection with Related JP Application No. 2011250220 on Dec. 15, 2015.
Unofficial English Translation of Japanese Office Action issued in connection with Related JP Application No. 2011248140 on Dec. 22, 2015.
Unofficial English Translation of Chinese Office Action issued in connection with Related CN Application No. 201110385851.9 on Jul. 26, 2016.
Unofficial English Translation of Japanese Office Action issued in connection with Related JP Application No. 2011248140 on Aug. 2, 2016.
European Office Action issued in connection with Related EP Application No. 11189253.5 on Aug. 19, 2016.
US Final Office Action issued in connection with Related U.S. Appl. No. 12/949,925 on Oct. 24, 2016.
Unofficial English Translation of Japanese Office Action issued in connection with Related JP Application No. 2011250220 on Nov. 22, 2016.

\* cited by examiner

LOW-INDUCTANCE, HIGH-EFFICIENCY INDUCTION MACHINE AND METHOD OF MAKING SAME

BACKGROUND OF THE INVENTION

Embodiments of the invention relate generally to induction motors having a low leakage inductance and, more particularly, to a method and system for designing low-inductance, high-efficiency induction machines by providing power converters that include silicon carbide metal-oxide-semiconductor field effect transistors (MOSFETs).

Induction machines are typically driven using a power converter with active silicon switching devices. The switching devices are typically operated using a pulse-width modulation (PWM) technique to convert a DC supply power to an AC power that can be used to drive the induction machine. In PWM, the switching devices are driven using a train of DC pulses. When a voltage is suddenly applied from the power converter across an inductive load, the current through the load rises almost linearly with time. When the voltage is then turned off, the current through the load does not immediately fall to zero but decreases approximately linearly with time, as the inductor's magnetic field collapses, and the current flows in a freewheeling diode. Thus, the input voltage pulses applied across the load by the power converter resembles a jagged current waveform. The variation in output current is typically known as the current ripple.

Current ripple is generally undesirable because it wastes energy in the inductor and may cause unwanted pulsations in the load. Current ripple produces undesirable EMI and mechanical vibrations, and generates harmonic losses in the motor. The harmonic current runs through the stator and rotor conductors and gives rise to harmonic copper losses, and the harmonic flux confines itself to the surface of the cores and creates harmonic core losses in the stator and rotor teeth. The higher the current ripple, the lower the quality of the current waveform of an induction machine.

Current ripple is primarily due to the harmonics contained in the PWM voltage waveform. For a given DC bus voltage, the current ripple is mainly dependent on the switching frequency of the power converter and the transient or leakage inductance of the machine. Equation 1 represents the machine current ripple factor as a ratio of the machine peak fundamental phase current.

$$k_{ripple} = \frac{1}{I_{max}} \frac{V_{DC} T_s}{4 L_\sigma}. \qquad \text{Eqn. 1}$$

$I_{max}$ is the peak fundamental phase current (A), $V_{DC}$ is the DC bus voltage (V), $T_S$ is the switching period (s), and $L_\sigma$ is the machine transient inductance (H).

If the leakage inductance of a phase of the induction machine is proportionally large, the current ripple will ordinary be low regardless of the switching frequency of the switching devices in the power converter. Thus, the higher the leakage inductance of an induction machine, the more closely the output current waveform resembles an ideal waveform. Accordingly, induction machines are typically designed to have a high enough leakage inductance to maintain a low current ripple.

However, designing a machine to have a high leakage inductance has a number of drawbacks including a reduced machine efficiency and a reduced machine flux-weakening capacity. Further, an increased leakage inductance injects harmonics via line notching in the power system.

For a number of applications, the leakage inductance associated with a particular phase is proportionately low. This low leakage inductance means that, for the same carrier frequency, the current ripple will be much higher. High current ripples inject potentially unacceptable amounts of noise into the motor. If the current ripple is high enough, this can cause the output to operate outside of its specified characteristics. In the case of an electric motor, for example, increased current ripple results in decreased control over torque and speed of the motor. Where the current ripple is high enough, the motor can fail altogether because it is not operating within its proper current range.

An extended flux-weakening capability is an important characteristic for an induction machine that is used, for example in a traction application, where it is desirable to operate the drive and induction motor over a wide speed range with a constant or near constant output power for speeds above the induction machine corner point. Operation at motor speed below the corner point is often referred to as operation in the "constant torque" region, while operation above the corner point of the induction machine is often referred to as operating in a "constant power" mode of operation. In general, a low-leakage inductance induction machine design allows "constant power" mode operation over a range of speeds in excess of 3 times the base speed of the induction machine.

It would therefore be desirable to design an induction machine that maintains a quality current waveform and that operates with a low leakage inductance to increase machine efficiency and extend the machine's flux-weakening capability.

BRIEF DESCRIPTION OF THE INVENTION

In accordance with one aspect of the invention, an electric drive system includes an induction machine and a power converter electrically coupled to the induction machine to drive the induction machine. The power converter comprising a plurality of silicon carbide (SiC) switching devices. The electric drive system further includes a controller that is electrically coupled to the power converter and that is programmed to transmit switching signals to the plurality of SiC switching devices at a given switching frequency such that a peak-to-peak current ripple is less than approximately five percent.

In accordance with another aspect of the invention, a method of manufacturing an electric drive system includes the steps of providing an induction machine having a given leakage inductance, and providing a SiC power converter having a plurality of SiC switching devices, wherein the SiC power converter is coupleable a power source. The method also includes the step of providing a controller that is programmed transmit switching signals to the plurality of SiC switching devices at a rate that minimizes a current ripple capable of being generated due to the given leakage inductance of the induction machine. Further, the method includes the step of coupling the SiC power converter to the induction machine to drive the induction machine and to the controller.

In accordance with another aspect of the invention, a vehicle drive system includes a power converter electrically coupled to an induction motor to drive the induction motor. The power converter includes a plurality of SiC switching devices, and the induction motor is designed to have a given leakage inductance. The vehicle drive system further includes a controller programmed to send switching signals to the plurality of SiC switching devices to cause the SiC switching devices to switch at a rate that minimizes current ripple generated due to the given leakage inductance of the induction motor.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
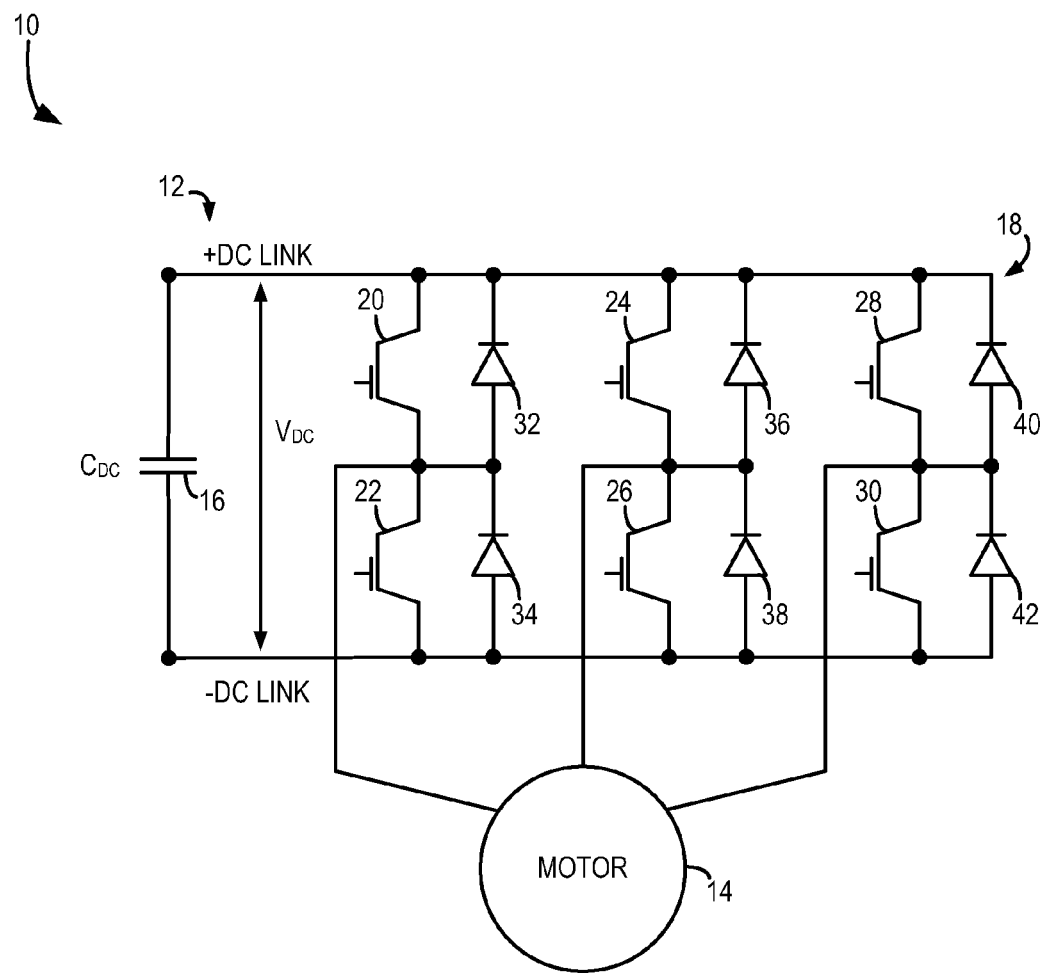
FIG. 1 illustrates a conventional induction machine drive system.

FIG. 1 illustrates a conventional three-phase induction machine drive system 10. System 10 includes a DC link 12 that provides a DC input voltage that is converted or inverted to an AC waveform that powers an AC induction machine 14. An input filter capacitor 16 is coupled across the DC link 12 for filtering the voltage VDC on the DC link 12. A power converter 18 receives the input voltage from DC link 12 when power flows from the DC link 12 to the AC induction machine 14. This direction of power flow is often referred to operating in a "motoring" mode. When the direction of power flow is from the induction machine 14 to the power converter 18, the input voltage to the power converter 18 is AC from the induction machine 14, while the output from the power converter 18 is a DC voltage on the DC link 12. Operation with power flow from the AC induction machine 14 to the power converter 18 is often referred to operation in a regenerative braking mode that is useful, for example, in a vehicle where it is desirable to hold a given value of speed on a downhill grade, or while decelerating the vehicle.

Power converter 18 is a typical 3-phase inverter having two series-connected switching devices per phase leg. For example, devices 20 and 22 form a first phase leg, devices 24 and 26 form a second phase leg, and devices 28 and 30 form a third phase leg. Devices 20-30 are conventional silicon semiconductor switching devices such as, for example, silicon IGBT, MOSFET, silicon bi-polar Darlington power transistor, GTO, SCR, or IGCT type devices that have a switching frequency of no more than 15-20 kHz depending on the power rating of induction machine 14. Diodes 32, 34, 36, 38, 40, 42 are coupled in anti-parallel relationship across respective silicon switching devices 20-30.

Figure 2:
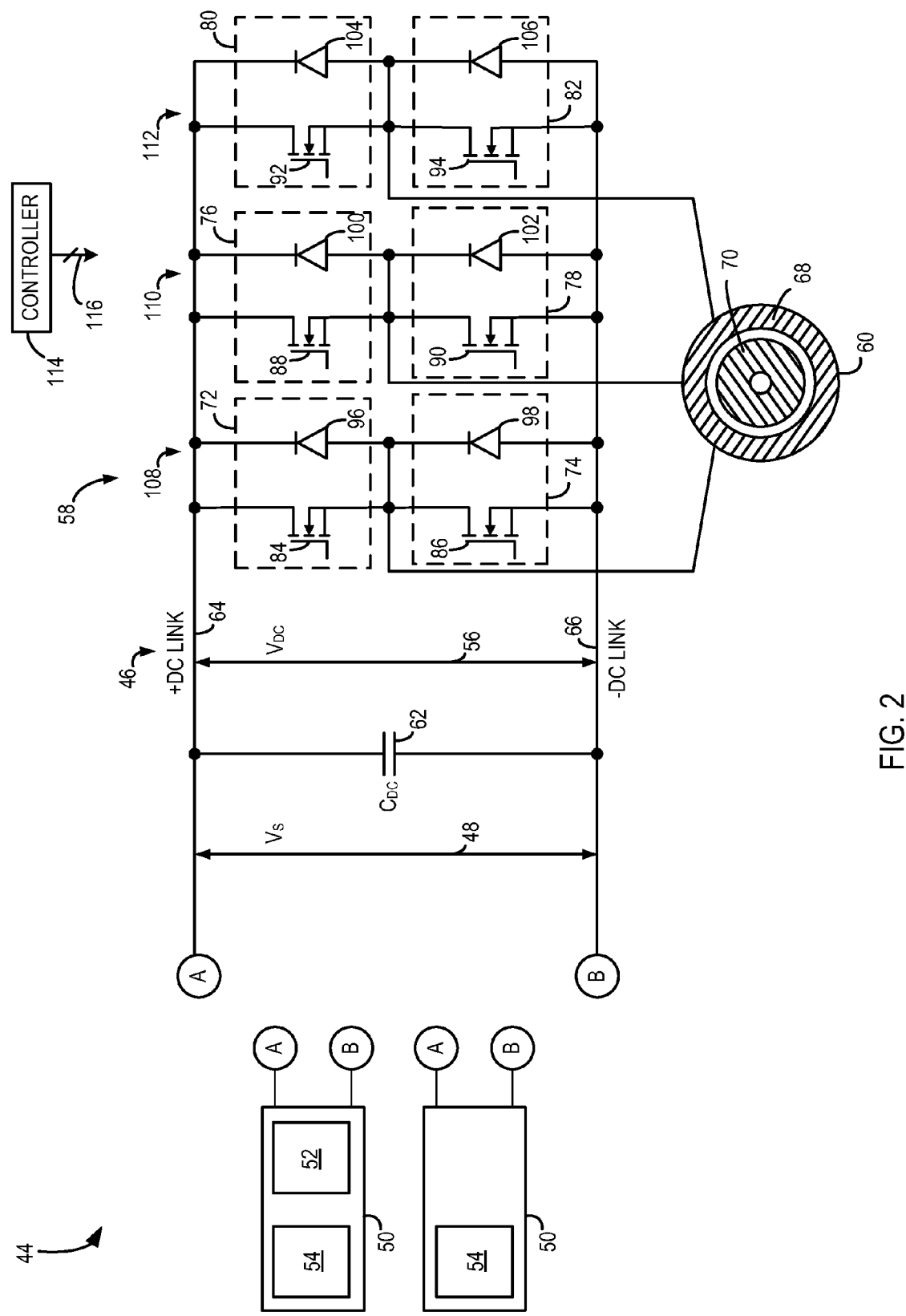
FIG. 2 illustrates a low-inductance, high-efficiency induction machine drive system, according to an embodiment of the invention.

FIG. 2 illustrates an induction machine drive system 44 in accordance with an embodiment of the invention. Drive system 44 includes a DC link 46 having a DC source voltage $V_S$ 48. Drive system 44 also includes a power source 50 that provides DC source voltage $V_S$ 48. In one embodiment, power source 50 includes an AC source 54 and a rectifier 52 configured to convert a voltage of AC source 54 to the DC link or source voltage $V_S$. In another embodiment, power source 50 includes a DC power source 54, such as a battery, a fuel cell, or a flywheel with an associated power electronic converter. In yet another embodiment, power source 50 includes a DC power source 54, such as a battery, a fuel cell, an ultracapacitor, or a flywheel with associated power electronic control coupled to a bi-directional DC-to-DC voltage converter 52 that boosts the source voltage to the DC link or source voltage $V_s$. DC link 46 supplies a DC output voltage $V_{DC}$ 56 to a power converter or inverter 58, which drives an induction machine 60. An input filter capacitor 62 is illustrated between a positive DC rail 64 and a negative DC rail 66 and serves to provide a filter function for the high frequency currents from power source 50 to ensure the power quality between positive and negative rails 64, 66.

Induction machine 60 includes a stator 68 and rotor assembly 70. According to various embodiments of the invention, induction machine 60 may be an asynchronous machine having a squirrel-cage rotor or slip-ring rotor, as examples, each of which may operate as a motor or generator.

Power converter 58 receives DC output voltage $V_{DC}$ 56 from DC link 46 and converts the DC output voltage to provide a suitable form of AC power for driving induction machine induction machine 60. According to one embodiment, power converter 58 is a three-phase DC to AC inverter having a plurality of switching devices 72, 74, 76, 78, 80, 82. Each switching device 72-82 includes a silicon carbide (SiC) MOSFET 84, 86, 88, 90, 92, 94 and an associated anti-parallel diode 96, 98, 100, 102, 104, 106. According to one embodiment, SiC MOSFETs 84-94 are SiC MOSFETs manufactured by General Electric Company having a switching frequency in excess of 50 kHz.

SiC is a crystalline substance that has material properties that make it an attractive alternative to silicon for high voltage, and high power applications. For example, SiC has a large bandgap that provides a very low leakage current, which facilitates elevated temperature operation. In fact, semiconductor devices manufactured on a SiC substrate can withstand temperatures in excess of 200 degrees C. SiC also has a high breakdown field that is about ten times that of silicon and a thermal conductivity that is about three times that of silicon, allowing higher power densities to be accommodated with SiC circuits. Further, SiC's high electron mobility enables high-speed switching, with some SiC circuits capable of achieving at least ten times switching performance gains over comparable silicon switching devices. Thus, SiC has been considered as an advantageous material for use in the manufacture of next generation power semiconductor devices. Such SiC devices include, for example, Schottky diodes, thyristors, and MOSFETs. Because SiC MOSFETs can be manufactured to be smaller than conventional silicon MOSFETs, SiC MOSFETs can be packaged in an automotive environment and can be operated at higher temperatures.

Moving from left to right in FIG. 2, switching devices 72, 74 are associated with a first output phase 108, switching devices 76, 78 are associated with a second output phase 110, and switching devices 80, 82 are associated with a third output phase 112. While a three-phase power converter and a three-phase induction machine illustrated in FIG. 2, one skilled in the art will understand that embodiments of the present invention are equally applicable to a single-phase or other multi-phase embodiments. For example, alternate embodiments include configurations with varying number of phases, e.g., n-phase, where n=1, 2, 4, 5, 6, 7, 8, 9 or higher number, where each phase of the power converter includes a plurality of switching devices similar to devices 84, 86, each with associated anti-parallel diodes similar to diodes 96, 98. One skilled in the art will recognize that, in such alternate embodiments, induction machine 60 will include a number of phase windings that matches the number of phases of the power converter 58. As an example, one alternative embodiment may include a 5-phase power converter coupled to an induction machine having 5 phase windings.

A controller 114 coupled to SiC MOSFETs 84-94 via respective lines 116 is configured to independently control switching of SiC MOSFETs 84-94. In one embodiment, controller 114 is a PWM controller and is programmed to generate a PWM signal for controlling SiC MOSFETs 84-94. One skilled in the art will recognize that alternative control techniques are equally applicable to embodiments of the invention.

The high switching frequency of SiC MOSFETs 84-94 allows induction machine 60 to be designed with a low leakage inductance without having to worry about the negative effect of current ripple on the quality of the current waveform. That is, induction machine 60 can have a low leakage inductance while maintaining a good quality waveform. In one embodiment, peak-to-peak current ripple is less than approximately 5%. By decreasing the leakage inductance of induction machine 60, voltage to induction machine 60 increases, thereby significantly increasing the efficiency of induction machine 60. Further, decreasing the leakage inductance of induction machine 60 extends its flux-weakening capability, therefore allowing an extension of the speed range where the drive system 44 can be operated in a "constant power" mode of operation. Constant power speed range is often referred to as a ratio of the maximum speed for operation in "constant power" versus the base speed of an induction machine where the torque can be held at a maximum or a constant value.

Therefore, according to one embodiment of the invention, an electric drive system includes an induction machine and a power converter electrically coupled to the induction machine to drive the induction machine. The power converter comprising a plurality of silicon carbide (SiC) switching devices. The electric drive system further includes a controller that is electrically coupled to the power converter and that is programmed to transmit switching signals to the plurality of SiC switching devices at a given switching frequency such that a peak-to-peak current ripple is less than approximately five percent.

According to another embodiment of the invention, a method of manufacturing an electric drive system includes the steps of providing an induction machine having a given leakage inductance, and providing a SiC power converter having a plurality of SiC switching devices, wherein the SiC power converter is coupleable a power source. The method also includes the step of providing a controller that is programmed transmit switching signals to the plurality of SiC switching devices at a rate that minimizes a current ripple capable of being generated due to the given leakage inductance of the induction machine. Further, the method includes the step of coupling the SiC power converter to the induction machine to drive the induction machine and to the controller.

According to yet another embodiment of the invention, a vehicle drive system includes a power converter electrically coupled to an induction motor to drive the induction motor. The power converter includes a plurality of SiC switching devices, and the induction motor is designed to have a given leakage inductance. The vehicle drive system further includes a controller programmed to send switching signals to the plurality of SiC switching devices to cause the SiC switching devices to switch at a rate that minimizes current ripple generated due to the given leakage inductance of the induction motor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric drive system comprising:
   an induction machine;
   a power converter electrically coupled to the induction machine to drive the induction machine, the power converter comprising a plurality of silicon carbide (SiC) switching devices; and
   a controller electrically coupled to the power converter and programmed to transmit switching signals to the plurality of SiC switching devices at a given switching frequency such that a peak-to-peak current ripple is less than approximately five percent.

2. The electric drive system of claim 1 wherein the plurality of SiC switching devices comprise a plurality of SiC metal-oxide-semiconductor field effect transistors (MOSFETs).

3. The electric drive system of claim 1 wherein the plurality of SiC switching devices are capable of switching at a frequency of at least 50 kHz.

4. The electric drive system of claim 1 wherein the power converter further comprises a plurality of diodes connected in an anti-parallel arrangement with the plurality of SiC switching devices.

5. The electric drive system of claim 1 wherein the power converter is a multi-phase power converter comprising N phases, where N is one of 2, 3, 4, 5, 6, 7, 8, and 9; and
   wherein the induction machine comprises N phase windings.

6. The electric drive system of claim 1 wherein the power converter is a single-phase power converter.

7. The electric drive system of claim 1 wherein the controller is a pulse-width modulated (PWM) controller programmed to generate a PWM signal for controlling the plurality of SiC switching devices.

8. A method of manufacturing an electric drive system comprising the steps of:
   providing an induction machine having a given leakage inductance;
   providing a silicon carbide (SiC) power converter having a plurality of SiC switching devices, wherein the SiC power converter is coupleable to a power source;
   providing a controller, wherein the controller is programmed transmit switching signals to the plurality of SiC switching devices at a rate that minimizes a current ripple capable of being generated due to the given leakage inductance of the induction machine; and
   coupling the SiC power converter to the induction machine to drive the induction machine and to the controller.

9. The method of claim 8 wherein providing the SiC power converter comprises providing a MOSFET SiC power converter having a plurality of metal-oxide-semiconductor field effect transistors (MOSFETs).

10. The method of claim 9 wherein providing the controller comprises providing a SiC switching controller programmed to cause the plurality of SiC switching devices to switch at a rate of at least 50 kHz.

11. The method of claim 8 wherein the providing the controller comprises providing a pulse-width modulated (PWM) controller programmed to generate a PWM signal for controlling the plurality of SiC switching devices.

12. The method of claim 8 wherein providing the SiC power converter comprises providing a power converter having one of 1, 2, 3, 4, 5, 6, 7, 8, and 9 phases.

13. The method of claim 12 wherein providing the SiC power converter comprises providing a three-phase power converter.

14. The method of claim 8 wherein providing the induction machine comprises providing an induction machine having one of 3, 5, 7, and 9 phase windings.

15. A vehicle drive system comprising:
a power converter electrically coupled to an induction motor to drive the induction motor, wherein the power converter comprises a plurality of silicon carbide (SiC) switching devices, and wherein the induction motor is designed to have a given leakage inductance; and
a controller programmed to send switching signals to the plurality of SiC switching devices to cause the SiC switching devices to switch at a rate that minimizes current ripple generated due to the given leakage inductance of the induction motor.

16. The vehicle drive system of claim 15 wherein the plurality of SiC switching devices comprise a plurality of SiC metal-oxide-semiconductor field effect transistors (MOSFETs).

17. The vehicle drive system of claim 15 wherein the plurality of SiC switching devices are capable of operating at a switching frequency of at least 50 kHz.

18. The vehicle drive system of claim 15 wherein the controller is a pulse-width modulated (PWM) controller programmed to generate a PWM signal for controlling the plurality of SiC switching devices.

19. The vehicle drive system of claim 15 further comprising a voltage source coupled to a DC link and configured to provide a source voltage to the DC link.

20. The vehicle drive system of claim 19 wherein the voltage source comprises a DC source comprising at least one of a battery, an ultracapacitor, and a flywheel.

21. The vehicle drive system of claim 19 wherein the voltage source comprises a DC source and a bi-directional DC-to-DC voltage converter configured to boost a voltage of the DC source to a DC link voltage.

22. The vehicle drive system of claim 21 the DC source comprises at least one of a battery, an ultracapacitor, and a flywheel.

23. The vehicle drive system of claim 19 wherein the voltage source comprises an AC source and a rectifier configured to convert a voltage of the AC source to a DC link voltage.

24. The electric drive system of claim 1 wherein the peak-to-peak current ripple is defined based on a current ripple factor, $k_{ripple}$, according to:

$$k_{ripple} = \frac{1}{I_{max}} \frac{V_{DC} T_s}{4 L_\sigma}$$

where $I_{max}$ is a peak fundamental phase current, $V_{DC}$ is a DC bus voltage, $T_S$ is a switching period, and $L_\sigma$ is a machine transient inductance.

* * * * *